United States Patent [19]

Silvestrini et al.

[11] 4,444,096
[45] Apr. 24, 1984

[54] FRUIT PEELING ROLLERS

[75] Inventors: Jesus A. Silvestrini; Juan C. Morsucci, both of Mendoza, Argentina

[73] Assignee: IMDEC S.R.L., Figueroa Alcorta, Argentina

[21] Appl. No.: 437,735

[22] Filed: Oct. 29, 1982

[51] Int. Cl.³ .......................... A23N 7/00; A23N 7/02
[52] U.S. Cl. ........................................ 99/585; 99/623
[58] Field of Search ................. 99/516, 536, 574, 584, 99/585, 617, 621, 622, 623–625, 626, 628, 629, 640; 15/3.17, 3.19, 3.2, 3.21; 53/228, 229, 232, 210, 211, 216

[56] References Cited

U.S. PATENT DOCUMENTS

| | | |
|---|---|---|
| 1,581,071 | 4/1926 | Lowe . |
| 1,681,920 | 8/1928 | Baccellieri ........................ 99/585 X |
| 2,332,093 | 10/1943 | Lowe . |
| 2,609,022 | 9/1952 | Lowe . |
| 2,776,690 | 1/1957 | Warren ................................ 99/585 |
| 2,801,659 | 8/1957 | Carter ................................. 99/585 |
| 3,156,276 | 11/1964 | Petrella et al. . |
| 3,811,000 | 5/1974 | Lazzarini ............................. 426/483 |
| 3,946,658 | 3/1976 | Smith ................................ 99/627 |

FOREIGN PATENT DOCUMENTS 2062400 6/1971 France ................................ 99/585

Primary Examiner—Timothy F. Simone
Attorney, Agent, or Firm—Duckworth, Allen, Dyer & Pettis

[57] ABSTRACT

A fruit peeling machine comprising improved fruit peeling rollers in which at least one of each pair of rollers is provided with axially extending ribs projecting radially outwardly from the roller sufficiently to cause the fruit carried thereupon contact substantially only the outer portions of such ribs without substantial contact between the fruit and the portions of the rollers intermediate adjacent said axially extending ribs.

4 Claims, 5 Drawing Figures

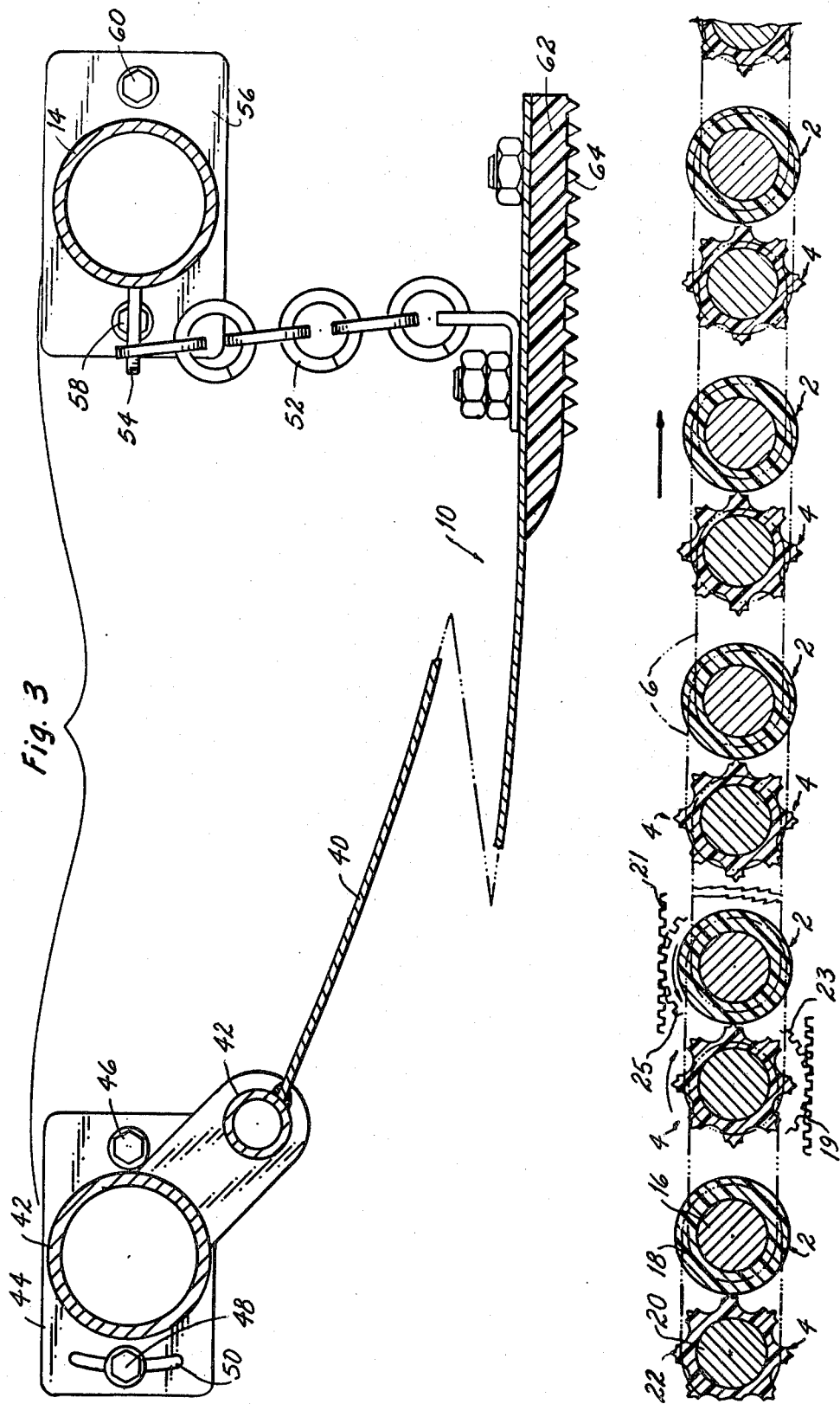

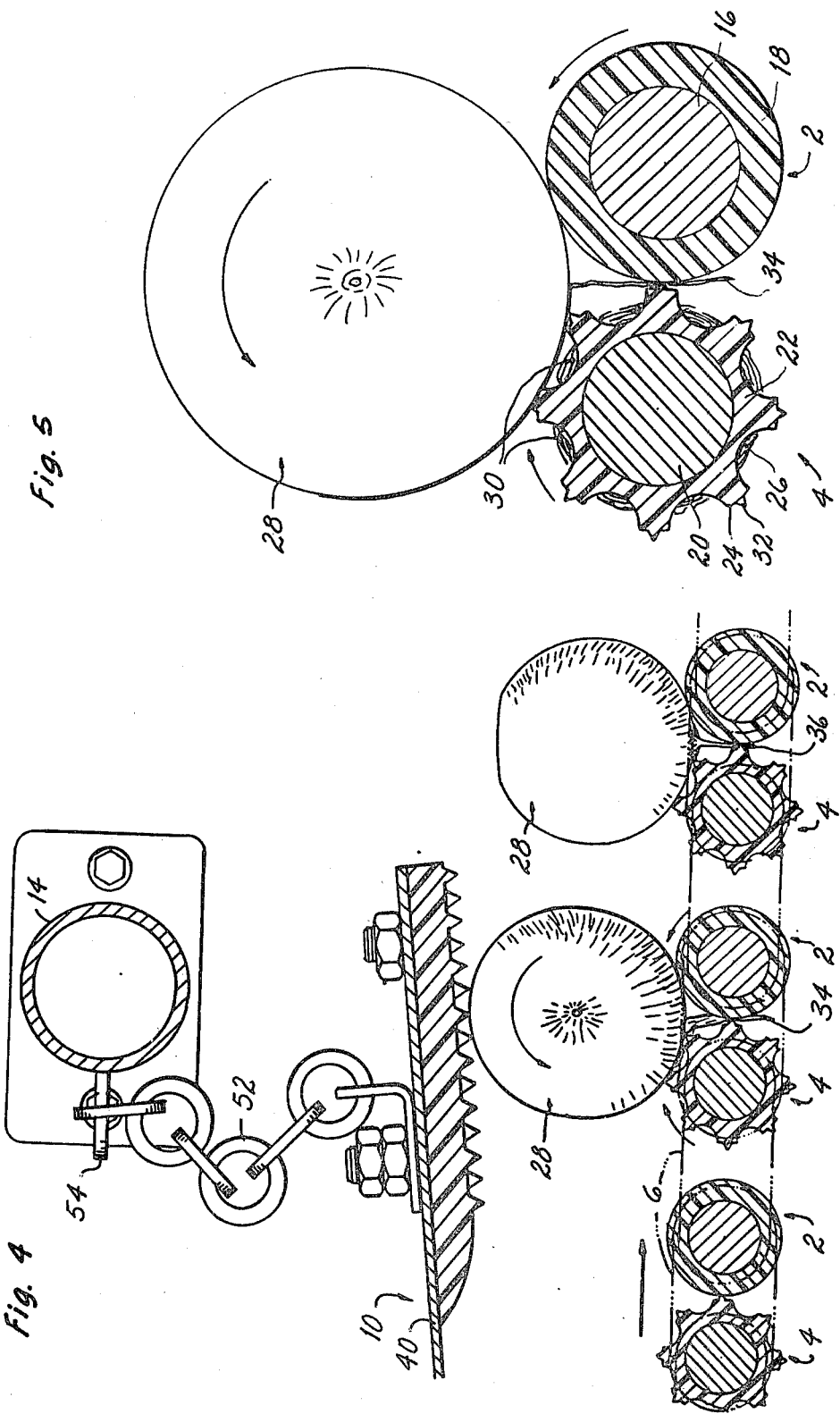

FRUIT PEELING ROLLERS

BACKGROUND OF INVENTION

This invention relates generally to the field of apparatus for peeling fruit. More particularly, it relates to apparatus for removing stems and pieces of fruit skin remaining after an initial peeling step.

Conventional equipment for peeling fruit, such as tomatoes, includes apparatus for scalding the fruit and then either application of caustic chemicals to remove the skin therefrom, or use of mechanical apparatus for slitting the skin and expelling the meat of the fruit therefrom while most of the skin remains gripped for disposal, as described in co-pending U.S. patent application Ser. No. 253,373, now U.S. Pat. No. 4,355,572. While this mechanical type of removal of skin from the fruit is highly effective and advantageous, it frequently happens that small portions of the fruit skin, as well as pieces of the fruit stalk, may remain attached to the fruit after this initial peeling step.

To remove any remaining pieces of the fruit skin, or fruit stalks, several well known types of equipment, such as that sold by the assignee of this application, include additional apparatus for completing removal of any such remaining undesirable portions from the fruit. This additional equipment conventionally has been in the form of a conveyor whose bed comprises an endless series of parallel adjacent rollers supported at their axial extremities by endless chains that carry these rollers around the endless path. The generally upward facing portion of this path conventionally is relatively flat to receive the fruit and carry it along such a relatively flat path to the end thereof, whereupon it is discharged down a chute. This generally flat path is conventionally inclined slightly upwardly from the point of entry of the fruit to the point of discharge.

Adjacent pairs of the rollers comprising this endless conveyor are driven for rotation in mutually opposing directions such that the upper surfaces of each pair of these rollers, while moving along the generally flat upward facing portion of the path, rotate toward one another. This rotation, combined with contact between the adjacent rollers of each respective pair, caused those rollers to function as pinch rollers such that any pieces of fruit skin or stalks of fruit caught between them will be pulled downwardly away from the fruit and removed therefrom.

To increase the friction between the fruit and the pair of peeling rollers upon which the fruit may rest, it is conventional for one of each mutually adjacent pair of rollers to be provided with small ridges projecting radially outwardly and extending axially along the rollers. However, the small ridges provided on conventional rollers hve required constant cleaning by jets of water to remove accumulations of fruit pulp that form on the roller surfaces. It has been necessary to remove such accumulation to maintain the necessary frictional engagement between the rollers and the first to obtain gripping and removal of the fruit skin.

The necessity for constant water cleaning of the rollers is highly disadvantageous for several reasons. Absent the use of the cleaning water, any tomato pulp that is removed from the fruits themselves can be recovered and processed into additional products, such as tomato paste. Likewise, additional products could be produced from the pieces of tomato skin and any tomato juice that may be lost by the fruit in this peeling process. If additional cleaning water is used it dilutes such juices and must be evaporated for these by-products to be recovered and used. Additionally, and more significantly, in some geographical areas of chronic water shortage, the cost of substantial quantities of cleaning water may be significant. In many such areas restrictions are being imposed upon the permissible levels of contamination of any water discharged from processing plants. These restrictions thus require expensive purifications of cleaning water before it can be discharged. For all of these reasons the continuous water cleaning required of conventional peeling rollers has become highly disadvantageous to the processing of fruit such as tomatos.

SUMMARY OF THE INVENTION

To overcome the disadvantages of the prior art, it is an object of the present invention to provide an improved configuration of peeling roller for removing skin and stalks from fruit such as tomatoes and which will not require frequent water cleaning to remain effective and efficient. It is a further object of this invention to provide such an improved peeling roller which will improve the efficiency in the removing of stalks and skin from the fruit by increasing the rotation of the fruit upon the rollers when supported thereby.

To achieve the foregoing, as well as other objects, improved fruit peeling rollers are disclosed in which at least one of each pair of rollers is provided with axially extending ribs projecting radially outwardly from the roller sufficiently to cause the fruit carried thereupon contact substantially only the outer portions of such ribs without substantial contact between the fruit and the portions of the rollers intermediate adjacent said axially extending ribs.

BRIEF DESCRIPTION OF THE DRAWINGS

This invention will be described with reference to the accompanying drawings in which:

FIG. 3 is a cross-sectional end view of a pair of peeling rollers according to this invention, depicted as removing skin from a supported fruit.

FIG. 4 is a side sectional view of a portion of the apparatus of FIG. 1, illustrating both the peeling roller assemblies according to this invention and also the pressure plate arrangement; and FIG. 5 is a side-sectional view of the apparatus illustrated in FIG. 4 with a fruit to be peeled interposed between the pressure plate and the supporting peeling rollers.

DESCRIPTION OF A PREFERRED EMBODIMENT

Figure 1:
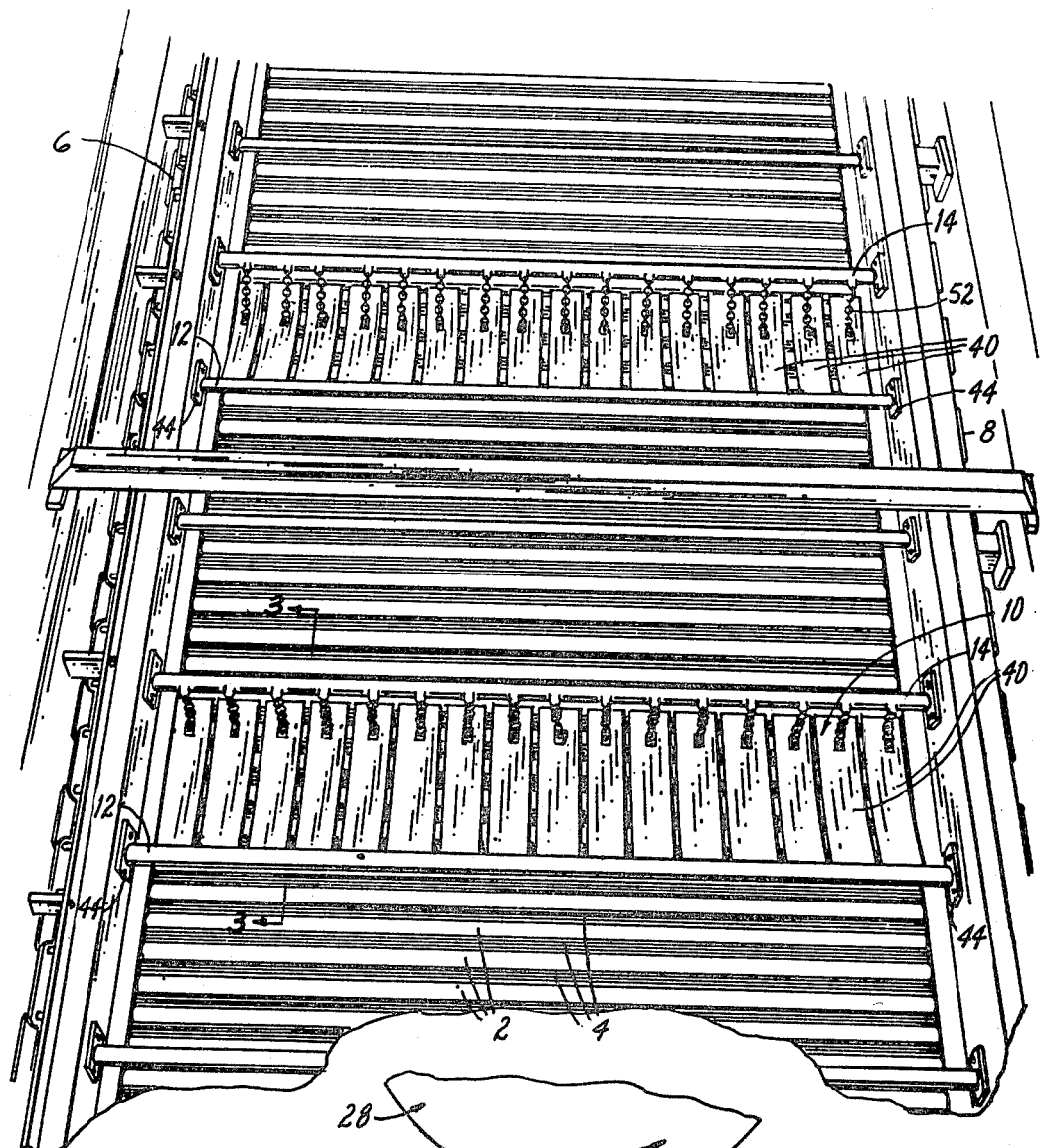
FIG. 1 is a partial top perspective view of the peeling apparatus incorporating the improved peeling rollers of this invention.

A particularly preferred embodiment of the peeling apparatus of this invention is illustrated in the drawings of FIGS. 1, 3, 4, and 5.

As illustrated in the top perspective view of FIG. 1, the apparatus of this invention is generally conventional in overall arrangement. This apparatus includes a plurality of pairs of mutually counter-rotating rollers 2 and 4, the axially outermost ends of which are supported by endless members such as chains 6 and 8 for movement around an endless path, which path incorporates to generally flat upwardly facing portion shown in FIG. 1. Additionally, the apparatus illustrated includes one or more pressure plate assemblies extending across and above this path portion of the rollers, with the pressure plate assemblies of the present invention comprising a plurality of separate, adjacent pressure plates 10, described in greater detail below. These pressure plate assemblies are mounted to the apparatus by means of suitable cross members 12 and 14 extending between the lateral extremities of the apparatus. In the illustration of FIG. 1 the direction of movement of the chain 6 and 8, and thus of the roller pairs 2 and 4, around the endless path is in a direction away from the viewer.

A preferred embodiment of the particularly novel and inventive features of the apparatus of FIG. 1 is illustrated in the sectional view, on substantially larger scale, of FIG. 3, taken along lines 3—3 of FIG. 1. The adjacent pairs of cooperating peeling rollers 2 and 4 are shown in section carried by endless chain 6 (shown in phantom). Corresponding chain 8 at the opposite end of the rollers is not shown.

Each peeling roller 2 comprises a support shaft 16 of steel or other suitable material encased in a smooth cylindrical sheath 18 of a rigid rubber or suitable synthetic resin. Each peeling roller 4 likewise comprises a shaft 20 in cased in a sheath 22 of a substantially rigid rubber or synthetic resin material. This sheath 22 incorporates on its outer surface a plurality, suitably 8 in this embodiment, of radially projecting, axially extending ribs 24, shown in greater clarity in FIG. 5.

Figure 2:
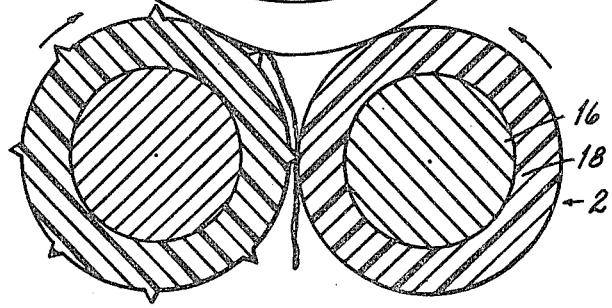
FIG. 2 is a cross-sectional end view of a pair of peeling rollers according to the conventional prior art.

As is shown most clearly in FIG. 5, the radially projecting ribs 24 are dimensioned and positioned so as to cause the fruit 28 to contact the roller 4 substantially only on the outer portions of those ribs 24. The roller surface portions 26 intermediate adjacent pairs of ribs 24 are recessed sufficiently to maintain substantial clearance between those portions and the body or skin of the fruit 28 being supported upon the roller pair 2,4. Thus, even if there is some build-up 30 of pulp or bits of skin from fruit previously processed, this build-up is not likely to reduce the frictional engagement between the ribs 24 and the outer surface of the fruit 28, as is the case with the prior art rollers illustrated in FIG. 2.

Rotational motion is imparted to the rollers 2 and 4, about their respective axis, by a rack and pinion arrangement. At at least one end of each of the ribbed rollers 4 is attached a pinion 23 (FIG. 3), with a corresponding pinion 25 being attached to the end of each of the smooth surfaced rollers 2. Affixed to at least one of the lateral extremities of the apparatus of FIG. 1 are racks 19 and 21. As shown in FIG. 3, rack 19 preferably is affixed below the axis of rollers 4 moving along the fruit carrying bed of the apparatus, in engagement with pinions 23 affixed to the end of each roller 4. As the rollers are carried along the bed of the apparatus by the chains 6 and 8 in the direction indicated by the arrow in FIG. 3, the engagement between rack 19 and pinion 23 imparts a clockwise rotation to the roller of FIG. 4. Correspondingly, rack 21 is affixed to the apparatus above the plane defined by the axis of rollers 2, in engagement with pinions 25, so that the movement of the rollers as carried by the chains 6 and 8 will impart a counterclockwise rotation to rollers 2. Thus is provided the counter-rotating movement between each of the rollers 2 and 4 of each respective roller pair.

The frictional engagement between the ribs, particularly the outer toothed portions 32 thereof, of the rollers 4 will obviously be greater than that of the counter-rotating, smooth-surfaced rollers 2. This will effect rotation of the fruit in the direction shown, counterclockwise in FIGS. 4 and 5. Such rotation of the fruit is in the same direction as that of supporting roller 2, such that the mutually contacting portions of their respective outer surfaces are moving in opposite directions, as shown in FIG. 5. Thus any remaining portions of the fruit skin 34 will be stripped from the fruit in the manner shown in FIGS. 4 and 5, being caught between the engagement of the outermost portions of the ribs 24 of roller 4 and the outer surface of roller 2. Likewise, any remaining stems or peduncles 36 still remaining on the fruit will be caught between the rollers 2 and 4 and pulled from the fruit, in the manner shown in FIG. 4.

To increase the frictional engagement between the fruit and the peeling roller pairs 2 and 4, a pressure plate assembly as shown in FIGS. 1, 3, and 4 is provided as an additional improvement in this invention. In this preferred embodiment, the pressure plate assembly comprises a plurality of resiliently mounted, separate pressure plates 10 extending across the entire bed of the apparatus transverse to the direction of movement of the chains 6 and 8 and thus of the roller pairs 2 and 4. This direction of movement of the chain and roller pairs is indicated by the arrows in FIGS. 3 and 4.

A typical pressure plate assembly according to the preferred embodiment is illustrated in the sectional view of FIG. 3. This assembly comprises a resilient member 40, suitably in the form of a strip of spring steel, conveniently attached at one end thereof in a rigid manner to mounting member 42, which in turn is rigidly attached to cross member 12 extending across the bed of the peeling apparatus, as shown in FIG. 1. This cross member 12 is rigidly attached at either end, such as by welding or by fasteners, to mounting brackets 44, which are, in turn, attached by suitable fasteners, such as cap screws 46 and 48, to the sidewalls of the peeling apparatus, as shown in FIG. 1. Suitably, the bracket 44 may be provided with one or more slotted apertures, such as for receiving fastener 48, to provide for adjustments of the position of bracket 44 and thus increasing or decreasing downward pressure exerted upon resilient member 40.

The end of resilient member 40 opposite that attached to bracket 42 is attached by means of a suitable linkage, such as chain 52, to a mounting member 54, such as a tab, attached to cross member 14. Cross member 14 is likewise affixed to each end thereof to a suitable mounting bracket 56, which, in turn, is attached to the sides of the peeling apparatus by appropriate fasteners, such as cap screws 58 and 60. The linkage 52 limits the downward extent of movement of the outer end of resilient member 40, maintaining it at all times spaced above the roller pairs 2 and 4, as shown in FIG. 3. Attached to the downward facing surface of resilient member 40 adjacent the end proximal linkage 52 preferably is mounted a plate 62 formed of a rigid material, either metal, hard rubber or a suitable synthetic resin. Formed on the downward facing surface of this plate 62 preferably are a plurality of pointed teeth or, alternatively, tapered ridges 64 for engaging a fruit passing therebeneath.

As shown in FIG. 4, a fruit, such as a tomato, is carried along the path of movement of the peeling apparatus by an adjacent pair of peeling rollers 2 and 4. In FIG. 4 this fruit 48 is shown passing between the roller pair 2,4 and the plate 62 affixed to the outer end of resilient member 40. The passage of this fruit 28 between the plate 62 and the roller pair 2,4, is shown as having deflected this outer end of the resilient member 40 upwardly. By virtue of this deflection and the resilience of member 40, downward pressure is exerted by the plate 62 against the fruit 28 urging it into firmer contact with the supporting roller 2,4. This firmer contact increases the frictional engagement of the fruit, particularly with the ribs 2,4 of roller 4. This increased frictional engagement will increase the rolling action imparted by roller 4 to the fruit 28 to enable the roller pair 2, 4 to engage effectively the surface of the fruit for removing pieces of the skin 34 therefrom.

Through the use of the improved feed rollers of this invention with their extended radially projecting ribs and substantially recessed portions intermediate those ribs this invention provides for improved frictional engagement between the fruit and the ribbed peeling roller 4 to effect rotation of and thus efficient removal of skin and stalks from the fruit. By virtue of this improved roller configuration, there is no longer the necessity for continuous water cleaning of these peeling rollers, as had been necessary with the prior art to remove pulp from the roller surfaces to maintain the engagement between the ribs and the fruit.

While the foregoing describes and illustrates a particularly preferred embodiment of the improved peeling rollers and pressure plate assembly of this invention, it is to be understood that this embodiment is illustrative only of the principles of the invention and is not intended to limit the scope of this invention. As numerous variations and modifications of this structure will become readily apparent to those skilled in the art, the scope of the invention is to be limited solely by the claims appended hereto.

What is claimed is:

1. In a fruit peeling machine including a plurality of pairs of counter-rotating rollers carried by an endless member for movement along an endless path in which a portion of said path faces upwardly to support a fruit thereupon, the improvement comprising:

at least one of each said pair of counter-rotating rollers having a plurality of axially extending ribs projecting radially outwardly from the center of the roller and having roller intermediate portions extending between each said rib, said ribs projecting sufficiently radially outwardly to provide that contact between a supported fruit and said roller occurs substantially only with the radially outermost surfaces of said outwardly projecting ribs, and each said rib including on said radially outermost surface a pointed toothed portion whereby the roller intermediate portions remain substantially out of contact with the fruit to localize the contact pressure between the fruit and the roller upon said ribs and their toothed portions.

2. The improved fruit peeling machine according to claim 1 wherein said roller intermediate portions are concave radially inwardly of the roller, whereby are provided additional areas of clearance between the fruit and the roller intermediate portions.

3. The improved fruit peeling machine according to claim 1 further comprising resiliently deflectable plate means for urging said supported fruit into firm contact with said rollers, whereby frictional engagement between the fruit and the rollers may be increased.

4. The improved peeling apparatus of claim 3 wherein the portion of said fruit urging plate means that contacts a fruit passing therebeneath is provided with a plurality of tapered projections extending toward said rollers for engaging a fruit passing beneath said urging means.

* * * * *